United States Patent [19]

Hyman et al.

[11] Patent Number: 5,275,480
[45] Date of Patent: Jan. 4, 1994

[54] COMPACT DISC STORAGE DEVICE

[76] Inventors: Richard Hyman, 723 Westmount Dr., #306, West Hollywood, Calif. 90069; Kenneth A. Tarlow, 626½ Santa Monica Blvd., Santa Monica, Calif. 90403

[21] Appl. No.: 863,417

[22] Filed: Apr. 3, 1992

[51] Int. Cl.⁵ .................................................. A47F 1/04
[52] U.S. Cl. ........................................ 312/9.14; 312/9.23; 312/272
[58] Field of Search ................... 312/9.11, 9.14, 9.23, 312/272, 275, 270.2, 272.5, 9.12, 9.13, 276, 9.21, 9.36, 9.35

[56] References Cited

U.S. PATENT DOCUMENTS

| 1,440,134 | 12/1922 | Clark | 312/275 |
| 1,755,074 | 4/1930 | Ray et al. | 312/9.54 |

FOREIGN PATENT DOCUMENTS

| 0695544 | 12/1930 | France | 312/9.36 |
| 0347332 | 4/1931 | United Kingdom | 312/9.36 |

Primary Examiner—Peter R. Brown
Assistant Examiner—Gerald A. Anderson
Attorney, Agent, or Firm—Robert M. Sperry

[57] ABSTRACT

The invention is a compact disc storage and retrieval box which stores a plurality of compact discs. Quick and easy retrieval of the desired disc is provided by a selector mechanism which lifts the desired disc and opens two sections of a hinged lid.

8 Claims, 2 Drawing Sheets

COMPACT DISC STORAGE DEVICE

BACKGROUND

1. Field of Invention

This invention relates to compact discs and is particularly directed to improved container means for storing and retrieving compact discs.

2. Prior Art

In recent years, compact discs have become extremely popular as a means of recording and reproducing music. However, as a person begins to acquire a collection of compact discs, a need rapidly arises for a safe, compact and convenient means for storing and retrieving the compact discs. Compact discs are frequently sold in oversized packages, which serve to attract prospective buyers, but which, once purchased, require excessive storage space. Slip jackets are generally provided for the compact discs, which serve to provide protection for the compact discs after removal from the sales package and which can be stacked together in a minimum of storage space. Such protection is desirable. However, when a plurality of compact discs are stacked together side-by-side, like books on a shelf, it is difficult to identify and locate a specific disc and it becomes necessary to leaf through the stack to find the desired disc. Numerous devices have been proposed, heretofore, for storing compact discs, but none of the prior art devices have been entirely satisfactory.

BRIEF SUMMARY AND OBJECTS OF INVENTION

These disadvantages of the prior art are overcome with the present invention and an improved compact disc storage and retrieval device is proposed which is compact and convenient and which can store a plurality of compact discs, while providing quick and easy retrieval of a desired one of the compact discs contained therein.

These advantages of the present invention are preferably attained by providing an improved compact disc storage and retrieval device comprising a box-like structure having a hinged lid, disc retrieval means mounted on the front wall of said box-like structure having a generally L-shaped arm extending downwardly and rearwardly within said box-like structure and formed with a bifurcated end portion engageable with a compact disc contained within said box-like structure to lift said compact disc and said hinged lid to permit retrieval of said disc from said storage and retrieval device, and selector means for selectably positioning said disc retrieval means along said front wall of said box-like structure to enable said disc retrieval means to retrieve a desired one of the compact discs stored within said box-like structure.

Accordingly, it is an object of the present invention to provide an improved compact disc storage and retrieval device.

Another object of the present invention is to provide an improved compact disc storage and retrieval device which is compact and convenient.

A further object of the present invention is to provide an improved compact disc storage and retrieval device which can store a plurality of compact discs, while providing quick and easy retrieval of a desired one of the compact discs contained therein.

A specific object of the present invention is to provide an improved compact disc storage and retrieval device comprising a box-like structure having a hinged lid, disc retrieval means mounted on the front wall of said box-like structure having a generally L-shaped arm extending downwardly and rearwardly within said box-like structure and formed with a bifurcated end portion engageable with a compact disc contained within said box-like structure to lift said compact disc and said hinged lid to permit retrieval of said disc from said storage and retrieval device, and selector means for selectably positioning said disc retrieval means along said front wall of said box-like structure to enable said disc retrieval means to retrieve a desired one of the compact discs stored within said box-like structure.

These and other objects and features of the present invention will be apparent from the following detailed description, taken with reference to the figures of the accompanying drawing.

DETAILED DESCRIPTION OF THE INVENTION

Figure 1:
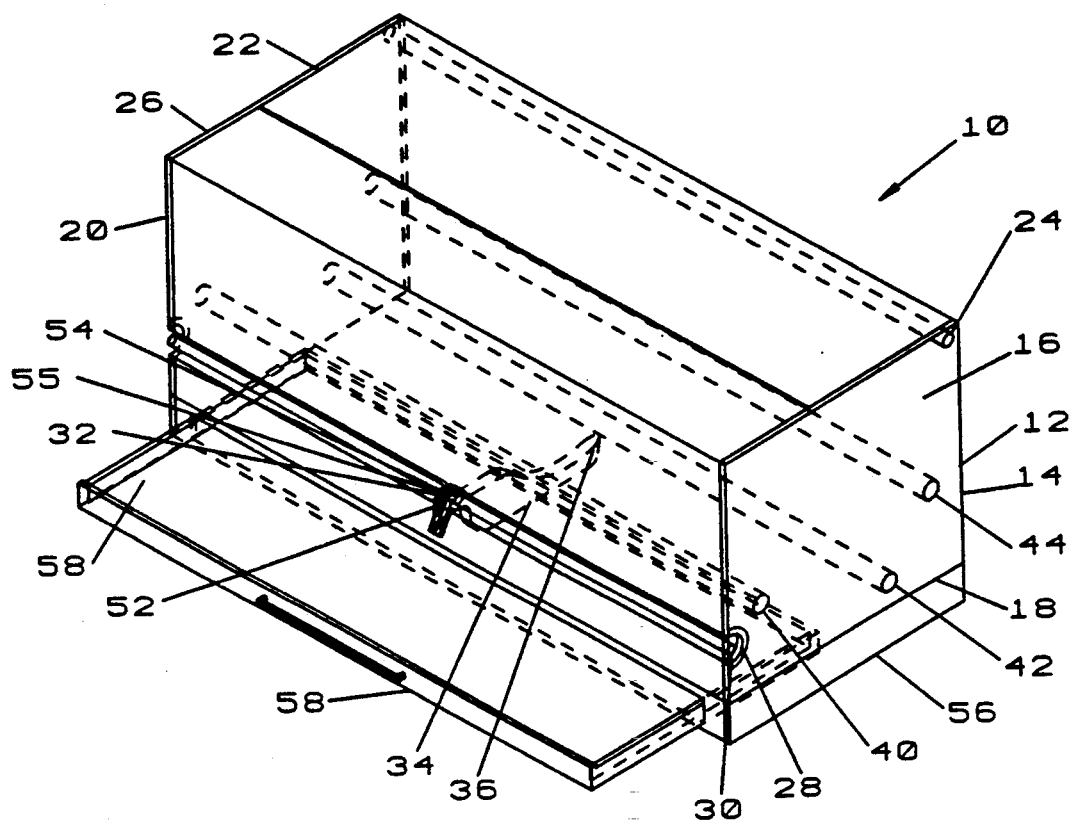
FIG. 1 is an isometric view of a compact disc storage and retrieval device embodying the present invention.
Figure 2:
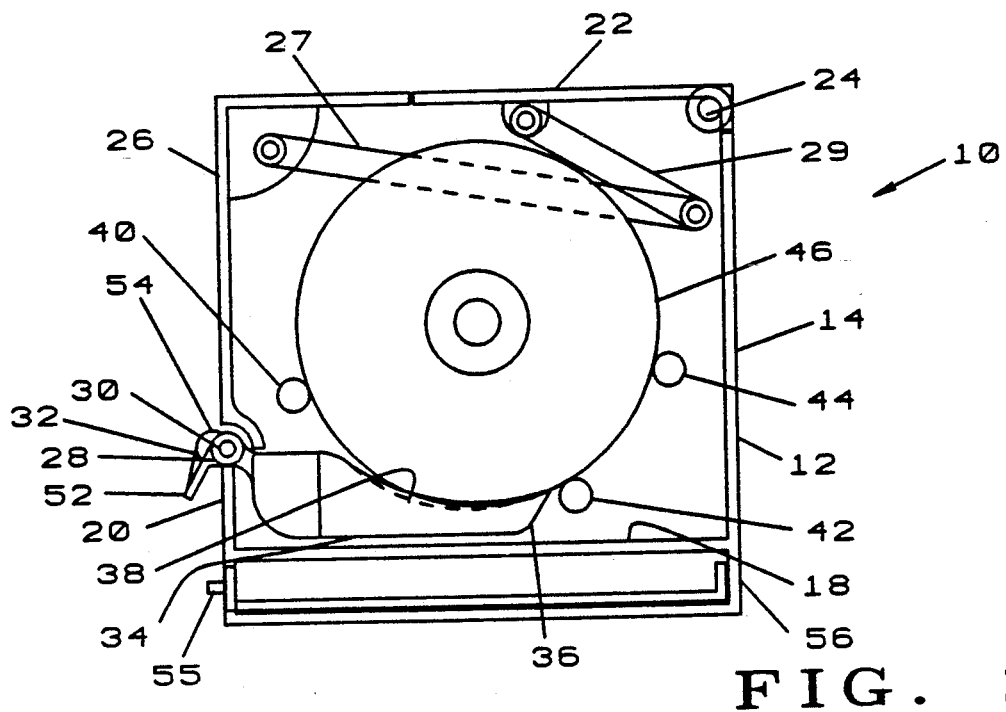
FIG. 2 is an end view of the compact disc storage and retrieval device of FIG. 1.
Figure 3:
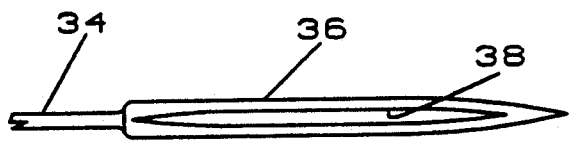
FIG. 3 is an enlarged detail view of the tip of the retriever arm of the compact disc storage and retrieval device of FIG. 1.
Figure 4:
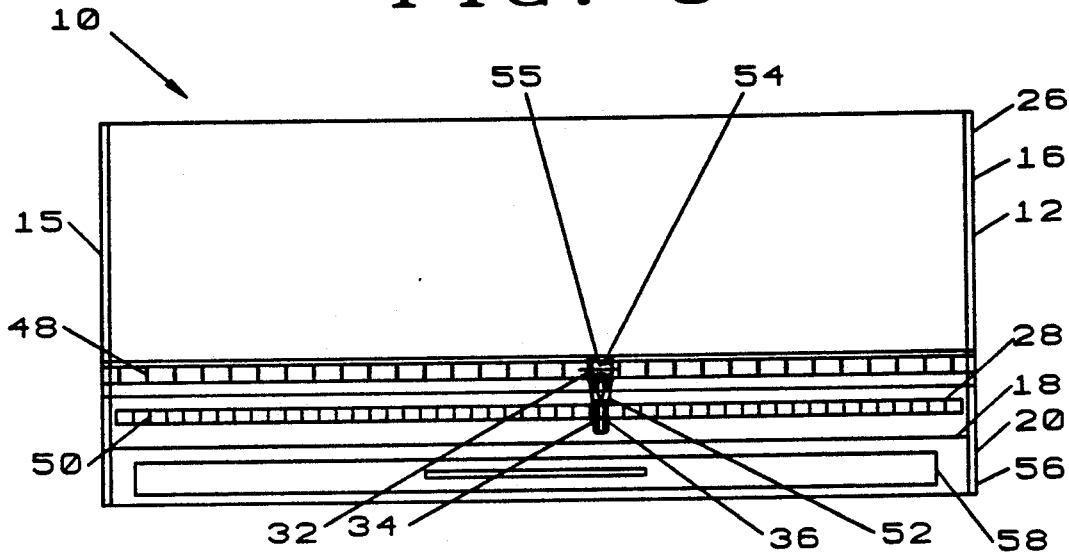
FIG. 4 is a front view of the compact disc storage and retrieval device of FIG. 1.
Figure 5:
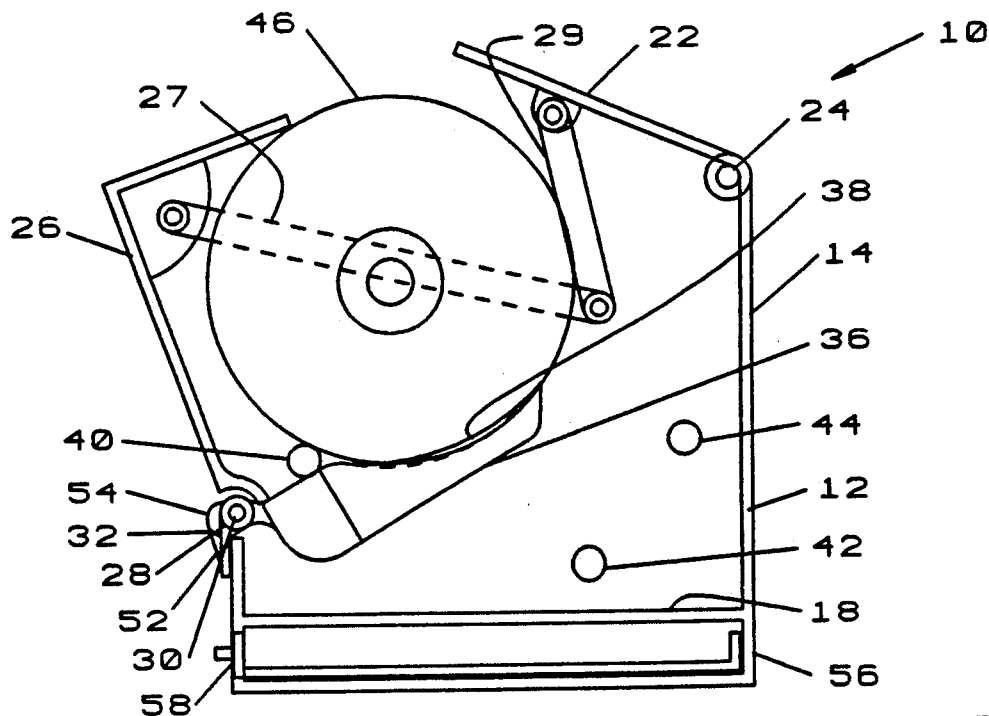
FIG. 5 is a view, similar to that of FIG. 2, showing the retriever arm of the compact disc storage and retrieval device of FIG. 1 during a retrieval operation.

In that form of the present invention chosen for purposes of illustration in the drawing, FIG. 1 shows a compact disc storage and retrieval device, indicated generally at 10, comprising a generally rectangular box-like member 12 having a back wall 14, end walls 15 and 16 and a bottom surface 18. The box-like member 12 also has a front wall 20 extending approximately one-half the height of the back wall 14 and a rear top member 22 covering approximately the rear one-half of the top of the box-like member 12. The rear top member 22 is pivotally mounted adjacent the top of the back wall 14, as by rod 24 which extends between the end walls 16. A generally L-shaped cover member 26 is mounted on a shaft 28, which, in turn, is pivotally mounted on a rod 30 extending between the end walls 16 adjacent the upper edge of the front wall 20. The L-shaped cover member 26 serves to enclose the upper front portion and the front top portion of the box-like member 12. As best seen in FIGS. 2 and 5, a rod 27 is pivotally mounted on the inside of the cover member 26 adjacent end wall 15 and extends rearwardly across the box-like member 12, to a point adjacent the back wall 14, where rod 27 is pivotally connected to a second rod 29 which, in turn, is pivotally connected to the inside of the rear top cover member 22. A slider member 32 is slidably mounted on the shaft 28 and has a generally L-shaped leg portion 34 extending downwardly and rearwardly within the box-like member 12. The end 36 of the leg portion 34 is bifurcated, as best seen in FIG. 3, and has a recess 38 formed between the facing surfaces of the bifurcated end 36. The recess 38, between the facing surfaces of end 36 of leg portion 34, is approximately equal to the thickness of a standard compact disc, such as disc 46, and will tend to releasably grip the compact disc 46 in recess 38 for removal from the box-like member 12. Several rods 40, 42 and 44 extend between the end walls 16, at spaced locations about the interior of the box-like member 12 and serve to support a plurality of compact discs, such as disc 46, within the box-like member 12, as seen in FIGS. 2 and 5, and the rods 40, 42 and 44 are preferably grooved to provide individual grooves for receiving respective ones of the compact discs stored within the compact disc storage and retrieval device 10. As best seen in FIG. 4, suitable indicia are provided on the shaft 28, as seen at 48, and adjacent the upper edge of the front wall 20, as seen at 50, corresponding to the locations of the grooves in the rods 40, 42 and 44. Thus, each of the indicia 48 and 50 correspond to a respective storage location, on the rods 40, 42 and 44, for a compact disc, such as disc 46. The slider member 32 carries a pointer 52 which cooperates with the indicia 48 and 50 to indicate which storage location is adjacent the end 36 of the leg portion 34 and, hence, which compact disc is in position for retrieval. In addition, the slider 32 is has a generally V-shaped notch 55 formed in the upper end thereof, as best seen in FIGS. 1 and 4, to receive a compact disc and to guide the compact disc during insertion of the compact disc into the box-like member 12. The slider member 32 also has a handle 54 which may be used to traverse the slider member 32 along the shaft 28 and, when in a desired position, to rotate the shaft 28, causing the cover portion 26 to rotate forwardly and causing the bifurcated end 36 of the leg portion 34 of slider 32 to engage and lift a selected compact disc, as seen in FIG. 5, thereby raising the rear top member 22 to allow the compact disc 46 to be taken out of, or returned into, the interior of the box-like member 12. If desired, a lower portion 56 may be provided below the bottom surface 18 of the box-like member 12 and a drawer 58 may be slideably mounted within the lower portion 56 to contain an index list 58 or other desired paraphernalia.

In use, a plurality of compact discs, such as disc 46, may be stored within the box-like member 12, each positioned within a respective set of the grooves of the rods 40, 42 and 44, as seen in FIG. 2, and because the walls 14, 16, 18 and 20 of the box-like member 12 and the cover member 26 serve to substantially enclose the box-like member 12, the compact discs will be protected from dust or possible damage. When it is desired to play one of the compact discs, the user grasps the handle 54 of the slider member 32 and traverses the slider member 32 along shaft 28 until pointer 52 is aligned with an appropriate one of the indicia 50 adjacent the upper edge of the front wall 20 of the box-like member 12. The user then moves the handle 54 downward to rotate the cover member 26 forwardly and to cause recess 38 in the end 36 of the leg portion 34 of slider member 32 to engage and lift the selected compact disc 46, as seen in FIG. 5. When cover member 26 is rotated forwardly, rod 27 is carried with the cover member 26 and, in turn, pulls rod 29, causing the rear top cover member 22 to be raised simultaneously and to allow the user to remove the compact disc 46 from the storage and retrieval device 10. When the user releases the handle 54, the cover member 26 and rear top portion 22 return to their normal positions, as seen in FIGS. 1 and 2, to continue storage and protection of any compact discs remaining within the box-like member 12. When the user desires to return the compact disc 46 to the storage and retrieval device 10, the user grasps handle 54 of the slider member 32 and traverses the slider member 32 along the shaft 28 until the pointer 52 is aligned with the appropriate indicia 50 on the upper edge of the front wall 20, corresponding to the appropriate grooves of the rods 40, 42 and 44 for the desired storage location for the compact disc 46. The user the moves the handle 54 of the slider member 32 downwardly to rotate the cover member 26 forwardly to open the box-like member 12, lifts the rear top portion 22 and inserts the compact disc 46 into the recess 38 of the end 36 of the leg portion 34 of slider 32. The user then releases the handle 54 of the slider member 32 to allow the leg portion 34 to drop the compact disc 46 into the selected grooves of the rods 40, 42 and 44 for storage.

Obviously, numerous variations and modifications can be made without departing from the spirit of the present invention. Therefore, it should be clearly understood that the form of the present invention described above and shown in the figures of the accompanying drawing are illustrative only and are not intended to limit the scope of the present invention.

What is claimed is:

1. An improved compact disc storage and retrieval device comprising:
    a box having a front wall, a rear wall, two end walls, a hinged lid extending over approximately the rear half of the top of said box, and a generally L-shaped cover member extending upward from approximately the center of said front wall and rearwardly over the front portion of the top of said box and cooperating with said hinged lid to form a top cover for said box,
    disc retrieval means mounted on the front wall of said box having a generally L-shaped arm extending downwardly and rearwardly within said box and formed with a recessed end portion engageable with a compact disc contained within said box to lift said compact disc to permit retrieval of said disc from said storage and retrieval device,
    means coupling said L-shaped cover member and said hinged lid for actuation by said disc retrieval means, and
    selector means for selectably positioning said disc retrieval means along said front wall of said box to enable said disc retrieval means to retrieve a desired one of the compact discs stored within said box.

2. The device of claim 1 wherein:
    said disc retrieval means is pivotally mounted adjacent the upper edge of said front wall of said box.

3. The device of claim 1 further comprising:
    means coupling said L-shaped cover member with said lid to cause said lid to open simultaneously with said cover member.

4. The device of claim 1 further comprising:
    indicia located adjacent an upper edge of the front wall of said box structure, each corresponding to a position of a compact disc storage location within said box, and
    means carried by said selector means for indicating the position of said disc retrieval means with respect to the compact disc storage position designated thereby.

5. The device of claim 1 further comprising:
    said front wall extends approximately half the height of said box.

6. The device of claim 1 further comprising:

said box structure having a lower portion formed with a drawer movable into and out of said lower portion for storing desired articles.

7. The device of claim 1 further comprising:

a plurality of rods mounted within said box and extending between said end walls to support a plurality of compact discs within said box so as to be engageable by said disc retrieval means for selective removal.

8. The device of claim 7 wherein:

said rods are each provided with a plurality of grooves each corresponding with a respective storage location for receiving a respective compact disc.

* * * * *